US012596855B2

(12) United States Patent
Zhang et al.

(10) Patent No.: US 12,596,855 B2
(45) Date of Patent: Apr. 7, 2026

(54) SYSTEM AND METHOD FOR ACCELERATING PHYSICAL SIMULATION MODELS DURING MICROELECTRONIC DEVICE FABRICATION

(71) Applicant: KLA Corporation, Milpitas, CA (US)

(72) Inventors: Yiting Zhang, Fremont, CA (US);
Ankur A. Agarwal, Newark, CA (US)

(73) Assignee: KLA Corporation, Milpitas, CA (US)

( * ) Notice: Subject to any disclaimer, the term of this patent is extended or adjusted under 35 U.S.C. 154(b) by 940 days.

(21) Appl. No.: 17/228,260

(22) Filed: Apr. 12, 2021

(65) Prior Publication Data

US 2022/0075916 A1      Mar. 10, 2022

Related U.S. Application Data

(60) Provisional application No. 63/075,223, filed on Sep. 7, 2020.

(51) Int. Cl.
*G06F 30/27* (2020.01)
*G06F 111/08* (2020.01)

(52) U.S. Cl.
CPC .......... *G06F 30/27* (2020.01); *G06F 2111/08* (2020.01)

(58) Field of Classification Search
CPC .. G06F 30/27; G06F 2111/08; G06F 2119/18; G06F 30/20; H01L 22/20; Y02P 90/02
See application file for complete search history.

(56) References Cited

U.S. PATENT DOCUMENTS

| | | | |
|---|---|---|---|
| 10,345,095 B1 | 7/2019 | Pandev et al. | |
| 10,502,549 B2 | 12/2019 | Pandev | |

(Continued)

FOREIGN PATENT DOCUMENTS

| | | |
|---|---|---|
| CN | 109191382 A | 1/2019 |
| CN | 110717851 A | 1/2020 |

(Continued)

OTHER PUBLICATIONS

Okada et al. "Post-processing of Markov chain Monte Carlo output in Bayesian latent variable models with application to multidimensional scaling", 2017, https://doi.org/10.1007/s00180-017-0759-6 (Year: 2017).*

(Continued)

*Primary Examiner* — Rehana Perveen
*Assistant Examiner* — Troy A Maust
(74) *Attorney, Agent, or Firm* — Suiter Swantz IP

(57) ABSTRACT

A method for accelerating physical simulation models during microelectronic device fabrication may include, but is not limited to, running a physical simulation model at a first grid size having a first resolution, generating outputs at the first grid size having the first resolution from the physical simulation model, inputting the outputs at the first grid size having the first resolution from the physical simulation model into a resolution enhancement model (REM), and generating outputs at a second grid size having a second resolution via the REM to reduce at least one of a computational time cost or a computational resource cost of a controller running the physical simulation model. The physical simulation model may simulate an on-wafer performance of at least one microelectronics fabrication process. The second grid size may be smaller than the first grid size. The second resolution may be higher than the first resolution.

33 Claims, 15 Drawing Sheets

(56)　　　　　　References Cited

U.S. PATENT DOCUMENTS

| | | | |
|---|---|---|---|
| 2009/0177451 A1 | 7/2009 | Heragu et al. | |
| 2016/0313651 A1 | 10/2016 | Middlebrooks et al. | |
| 2017/0351952 A1 | 12/2017 | Zhang et al. | |
| 2019/0206041 A1 | 7/2019 | Fang et al. | |
| 2020/0126205 A1 | 4/2020 | Liu et al. | |
| 2020/0278604 A1* | 9/2020 | Lo | G03F 7/70666 |
| 2020/0356711 A1* | 11/2020 | Egan | G06F 30/398 |
| 2023/0260083 A1* | 8/2023 | Edlund | G06T 3/4046 |
| | | | 382/156 |

FOREIGN PATENT DOCUMENTS

| | | |
|---|---|---|
| CN | 111627799 A | 9/2020 |
| WO | 2018217225 A1 | 11/2018 |
| WO | 2019048506 A1 | 3/2019 |
| WO | 2020035272 A1 | 2/2020 |

OTHER PUBLICATIONS

PCT International Search Report and Written Opinion for International Application No. PCT/US2021/048124 dated Dec. 17, 2021, 9 pages.

Goodfellow, I. et al., "Deep Learning", The MIT Press, 2016.

European Patent Office, Extended European Search Report received in EP Application No. 21864941.6, Sep. 26, 2024, 12 pages.

Kostas et al., "Using Machine Learning in the Physical Modeling of Lithographic Processes," SPIE Proceedings, vol. 10962, Apr. 4, 2019, 8 pages.

Taiwan Patent Office, Office Action received in TW Application No. 110130096, Jun. 16, 2025, 32 pages (including translation).

* cited by examiner

200

202 — RUN A PHYSICAL SIMULATION MODEL AT A FIRST GRID SIZE

204 — RUN A PHYSICAL SIMULATION MODEL AT A SECOND GRID SIZE

206 — DEVELOP A RESOLUTION ENHANCEMENT MODEL (REM) BASED ON OUTPUTS FROM THE PHYSICAL SIMULATION MODEL RUN AT THE FIRST GRID SIZE AND THE PHYSICAL SIMULATION MODEL RUN AT THE SECOND GRID SIZE

400

402 — RUN ONE OR MORE PHYSICAL SIMULATION MODELS AT A FIRST GRID SIZE

404 — RUN OUTPUTS FROM THE ONE OR MORE PHYSICAL SIMULATION MODELS THROUGH A REM

406 — GENERATE OUTPUTS AT A SECOND GRID SIZE VIA THE REM

500

502 PHYSICAL MODEL
(AT GRID SIZE "Δ")

504 OUTPUT
(AT GRID SIZE "Δ")

506 RESOLUTION
ENHANCEMENT
MODEL (REM)

508 OUTPUT
(AT GRID SIZE "ƒΔ")

600

602 — RUN ONE OR MORE PHYSICAL SIMULATION MODELS AT A FIRST GRID SIZE BASED ON ONE OR MORE PARAMETERS

604 — RUN OUTPUTS FROM THE ONE OR MORE PHYSICAL SIMULATION MODELS THROUGH A REM

606 — GENERATE OUTPUTS AT A SECOND GRID SIZE VIA THE REM

608 — COMPARE OUTPUTS AT THE SECOND GRID SIZE FROM THE REM WITH REFERENCE DATA

610 — ITERATIVELY ADJUST THE ONE OR MORE PARAMETERS

800

802 — RUN MULTIPLE TRIALS OF ONE OR MORE PHYSICAL SIMULATION MODELS AT A FIRST GRID SIZE

804 — RUN OUTPUTS FROM THE MULTIPLE TRIALS OF ONE OR MORE PHYSICAL SIMULATION MODELS THROUGH ONE OR MORE POST-PROCESSING MODELS

806 — RUN OUTPUTS FROM THE ONE OR MORE POST-PROCESSING MODELS THROUGH A REM

808 — GENERATE OUTPUTS AT A SECOND GRID SIZE VIA THE REM

1000

1002 — GENERATE A LEARNED REM

1004 — INPUT DATA FROM ONE OR MORE PHYSICAL SIMULATION MODELS AT A FIRST GRID SIZE

1006 — GENERATE OUTPUTS AT A SECOND GRID SIZE VIA THE LEARNED REM

1110

1112 PHYSICAL SIMULATION MODEL AT GRID SIZE Δ FOR N TRIALS

1108

LEARNED MODEL (REM)

1114 OUTPUT AT GRID SIZE $f\Delta$ FOR M TRIALS

TESTING/PRODUCTION PHASE

SYSTEM AND METHOD FOR ACCELERATING PHYSICAL SIMULATION MODELS DURING MICROELECTRONIC DEVICE FABRICATION

CROSS-REFERENCE TO RELATED APPLICATION

The present application claims the benefit of U.S. Provisional Application Ser. No. 63/075,223 filed on Sep. 7, 2020, which is incorporated herein by reference in the entirety.

TECHNICAL FIELD

The present invention generally relates to the fields of plasma processing and, more particularly, to a system and method for accelerating physical simulation models during microelectronic device fabrication.

BACKGROUND

Microelectronic device fabrication includes a variety of lithography and/or plasma process steps. For example, a sample may be exposed to tens or hundreds of lithography and/or plasma processes during fabrication. As critical dimensions in microelectronics devices continue to decrease, physical models utilized for simulation of processes such as lithography and/or plasma processes typically utilize the method of reducing the grid size (the model's characteristic length), or mesh refinement, to describe the device dimensions and the impact of the on-wafer process (or processes). Mesh refinement, however, may require large amounts of computational resources and can significantly delay time-to-solutions. In addition, the large number of simulations the physical models may require may delay development cycles.

Therefore, it would be desirable to provide a system and method that cure the shortfalls of the previous approaches identified above.

SUMMARY

A system is disclosed, in accordance with one or more embodiments of the present disclosure. In one illustrative embodiment, the system includes a controller. In another illustrative embodiment, the controller includes one or more processors and memory. In another illustrative embodiment, the memory is configured to store program instructions. In another illustrative embodiment, the one or more processors are configured to execute the program instructions causing the one or more processors to run a physical simulation model at a first grid size having a first resolution. In another illustrative embodiment, the physical simulation model simulates an on-wafer performance of at least one microelectronics fabrication process. In another illustrative embodiment, the one or more processors are configured to execute the program instructions causing the one or more processors to generate outputs at the first grid size having the first resolution from the physical simulation model. In another illustrative embodiment, the one or more processors are configured to execute the program instructions causing the one or more processors to input the outputs at the first grid size having the first resolution from the physical simulation model into a resolution enhancement model (REM). In another illustrative embodiment, the one or more processors are configured to execute the program instructions causing the one or more processors to generate outputs at a second grid size having a second resolution via the REM. In another illustrative embodiment, the second grid size is smaller than the first grid size. In another illustrative embodiment, the second resolution is higher than the first resolution. In another illustrative embodiment, the generation of the outputs at the second grid size having the second resolution via the REM based on the outputs at the first grid size having the first resolution from the physical simulation model reduces at least one of a computational time cost or a computational resource cost of the controller to run the physical simulation model.

A method is disclosed, in accordance with one or more embodiments of the present disclosure. In one illustrative embodiment, the method may include, but is not limited to, running a physical simulation model at a first grid size having a first resolution. In another illustrative embodiment, the physical simulation model simulates an on-wafer performance of at least one microelectronics fabrication process. In another illustrative embodiment, the method may include, but is not limited to, generating outputs at the first grid size having the first resolution from the physical simulation model. In another illustrative embodiment, the method may include, but is not limited to, inputting the outputs at the first grid size having the first resolution from the physical simulation model into a resolution enhancement model (REM). In another illustrative embodiment, the method may include, but is not limited to, generating outputs at a second grid size having a second resolution via the REM. In another illustrative embodiment, the second grid size is smaller than the first grid size. In another illustrative embodiment, the second resolution is higher than the first resolution. In another illustrative embodiment, the generation of the outputs at the second grid size having the second resolution via the REM based on the outputs at the first grid size having the first resolution from the physical simulation model reduces at least one of a computational time cost or a computational resource cost of a controller running the physical simulation model.

A system is disclosed, in accordance with one or more embodiments of the present disclosure. In one illustrative embodiment, the system includes a metrology subsystem configured to acquire one or more measurements of a portion of a sample. In another illustrative embodiment, the system includes a controller. In another illustrative embodiment, the controller includes one or more processors and memory. In another illustrative embodiment, the memory is configured to store program instructions. In another illustrative embodiment, the one or more processors are configured to execute the program instructions causing the one or more processors to obtain one or more inputs from the metrology subsystem, wherein the one or more inputs include images having a first resolution. In another illustrative embodiment, the one or more processors are configured to execute the program instructions causing the one or more processors to run a physical simulation model at a first grid size having the first resolution. In another illustrative embodiment, the physical simulation model simulates an on-wafer performance of at least one microelectronics fabrication process. In another illustrative embodiment, the one or more processors are configured to execute the program instructions causing the one or more processors to generate outputs at the first grid size having the first resolution from the physical simulation model. In another illustrative embodiment, the one or more processors are configured to execute the program instructions causing the one or more processors to input the outputs at the first grid size having the first resolution from the physical simulation model into a resolution enhancement model (REM). In another illustrative embodiment, the one or more processors are configured to execute the program instructions causing the one or more processors to generate outputs at a second grid size having a second resolution via the REM. In another illustrative embodiment, the second grid size is smaller than the first grid size. In another illustrative embodiment, the second resolution is higher than the first resolution. In another illustrative embodiment, the generation of the outputs at the second grid size having the second resolution via the REM based on the outputs at the first grid size having the first resolution from the physical simulation model reduces at least one of a computational time cost or a computational resource cost of the controller to run the physical simulation model.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
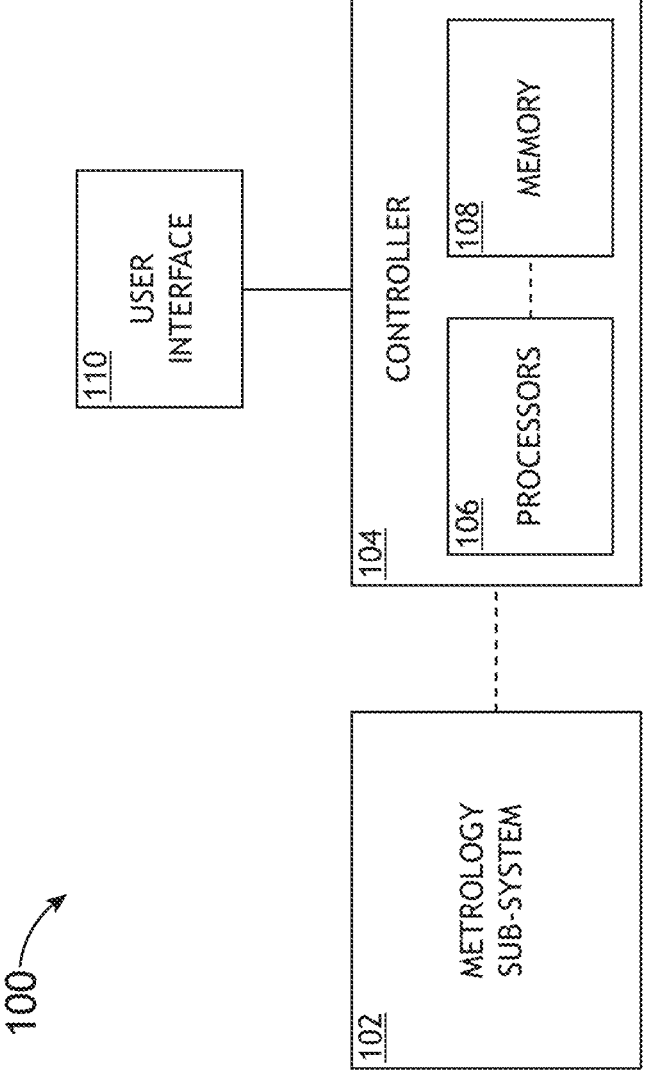
FIG. 1A illustrates a simplified block diagram of a system for accelerating physical simulation models during microelectronic device fabrication, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Microelectronic device fabrication includes a variety of lithography and/or plasma process steps. For example, a sample may be exposed to tens or hundreds of lithography and/or plasma processes (e.g., etch, deposition, ion implantation, or the like) during fabrication. As critical dimensions in microelectronics devices continue to decrease, physical models utilized for simulation of processes such as lithography and/or plasma processes typically utilize the method of reducing the grid size (the model's characteristic length), or mesh refinement, to describe the device dimensions and the impact of the on-wafer process (or processes).

Mesh refinement, however, may require large amounts of computational resources and can significantly delay time-to-solutions. For example, mesh refinement may require computational resources such as logical cores, memory, and disk space. The computational time cost and/or computational resources cost for mesh refinement scales on the order of $O(n^{3-4})$ based on the degree of mesh refinement. For example, if the grid size reduces by a factor 5, memory occupancy increases by a factor of 125 and the time-to-solutions increases by at least a factor of 125, such that at least 125 logical cores may be needed for the same time-to-solution.

In addition, the large number of simulations the physical models may require may delay development cycles. To meet the time-to-market demands of the next generation microelectronics devices, physical simulation models are often utilized to describe various aspects of the on-wafer processes. Physical simulation models use grids of cells to establish spatial locations where calculations are performed to make estimation of the traits (e.g., patterns, or the like) that are of concern for that model. To capture a higher level of details in the model, a smaller grid cell size may be utilized. However, this higher level of detail comes at the expense of longer computational times which reduce the efficacy of the model to accelerate the process development cycle. For example, physical models may be utilized for process development and/or process window optimization, and hundreds and thousands of simulations may need to be completed in a short time period (e.g., as compared to the actual expense of running the physical experiments.) As such, long simulation times are not efficient to development cycles (e.g., a customer's development cycle).

Further, as the critical dimension of features in micro-electronic device fabrication continues to decrease, the challenges of developing processes that enable the continuous reduction of features in microelectronics fabrication increase. For example, the time to develop processes that are manufacturable on a large scale is increasing, as well as the research and development costs associated with developing the processes.

As such, embodiments of the present disclosure are directed to a system and method for accelerating physical simulation models during microelectronic device fabrication, which have advantages over conventional systems and methods. For example, embodiments of the present disclosure are directed to using physical simulation models to enable an accelerated time-to-solution while retaining the benefits (or requirements) of a higher level of detail afforded by smaller grid sizes, allowing for the reduction of research and development time and cost. By way of another example, embodiments of the present disclosure are directed to allowing for the mesh refinement to be independent of the physical simulation. By way of another example, embodiments of the present disclosure are directed to using a dummy process condition to pretrain a deep learning (DL) model. By way of another example, embodiments of the present disclosure are directed to enhancing simulation accuracy and visualization while maintaining a desired fast computation time.

FIGS. 1A-13 in general illustrate a system and method for accelerating physical simulation models during microelectronic device fabrication, in accordance with one or more embodiments of the present disclosure.

FIG. 1A illustrates a simplified block diagram of a system for accelerating physical simulation models during micro-electronic device fabrication, in accordance with one or more embodiments of the present disclosure. In one embodiment, the system 100 includes a metrology sub-system 102. In another embodiment, the system 100 includes a controller 104 including one or more processors 106 and memory 108. The controller 104 may include or may be communicatively coupled to a user interface 110.

It is noted herein that the metrology sub-system 102 may include any metrology sub-system 102 known in the art including, but not limited to, an optical metrology system, a charged particle-based metrology system, or the like. For example, the metrology sub-system may include, but is not limited to, an optical critical dimension (OCD) tool, a critical-dimension scanning electron microscopy (CD-SEM) tool, a transmission electron microscopy (TEM) tool, a cross-section scanning electron microscopy (X-SEM) tool, or the like.

In another embodiment, the controller 104 is communicatively coupled to the metrology sub-system 102. In this regard, the one or more processors 106 of the controller 104 may be configured to receive one or more measurement signals from the metrology sub-system 102. This collected data may be used to generate and/or adjust the physical simulation models, further discussed herein. In addition, the one or more processors 106 of the controller 104 may be configured to generate one or more control signals to adjust one or more characteristics/parameters of the metrology sub-system 102.

In another embodiment, the system 100 may further include one or more process tools communicatively coupled to the controller 104. The one or more process tools may include any process tool for microelectronics fabrication known in the art including, but not limited to, a lithography tool and/or a plasma process tool (e.g., an etching tool, a deposition tool, a polishing tool, a scanner, or the like). For example, the controller 104 may be configured to generate one or more control signals configured to adjust one or more characteristics of one or more process tools in a feed-forward or a feed-back loop based on a physical simulation model. For instance, the one or more processors 106 of the controller 104 may be configured to generate one or more control signals to a downstream process tool. In another instance, the one or more processors 106 of the controller 104 may be configured to generate one or more control signals to an upstream process tool.

Figure 1B:
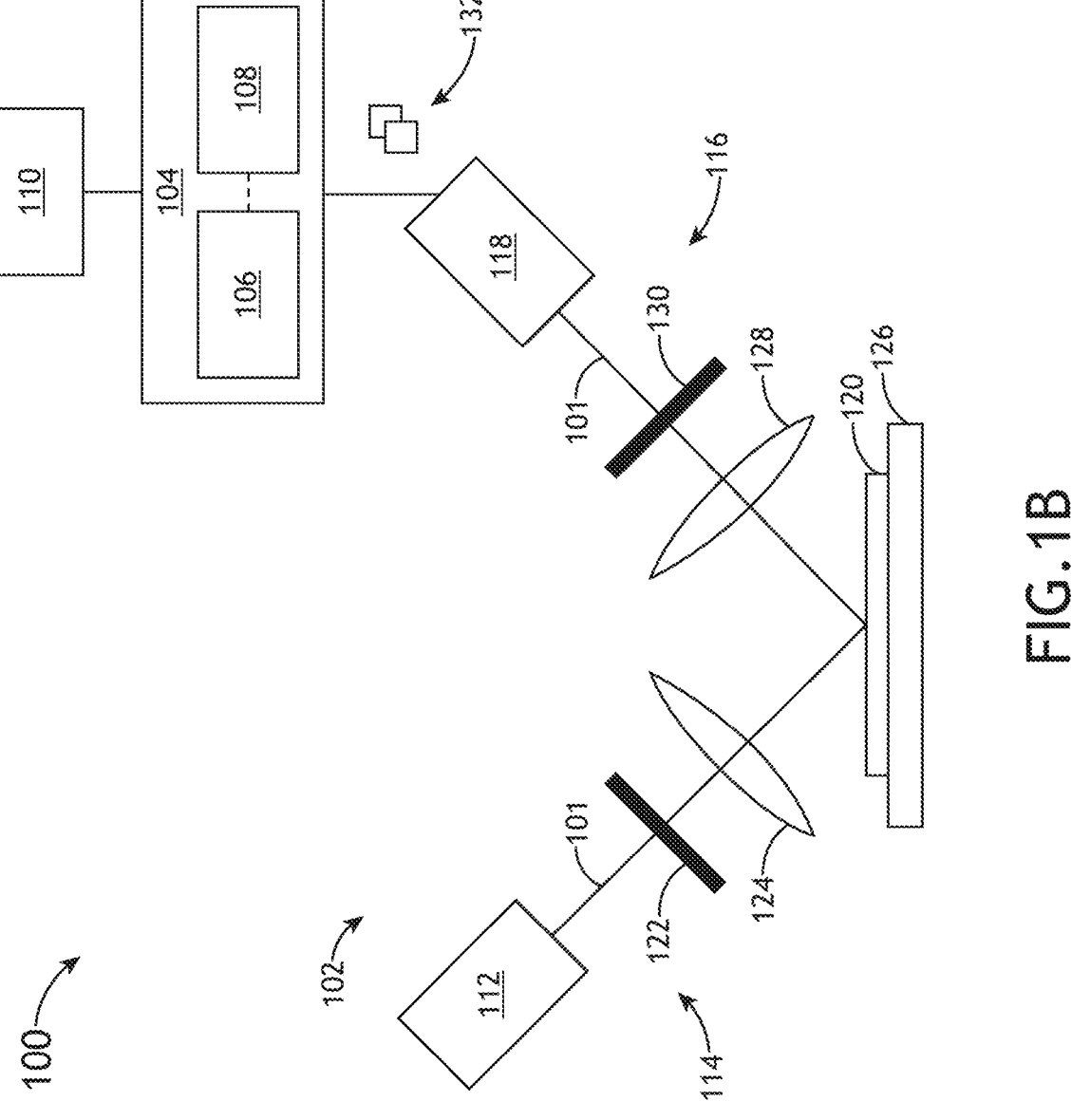
FIG. 1B illustrates a simplified schematic view of a system for accelerating physical simulation models during microelectronic device fabrication, in accordance with one or more embodiments of the present disclosure.

FIG. 1B illustrates a simplified schematic view of a metrology sub-system 102 arranged in a reflectometry and/or ellipsometry configuration, in accordance with one or more embodiments of the present disclosure.

In one embodiment, the metrology sub-system 102 includes an illumination source 112, an illumination arm 114, a collection arm 116, and a detector assembly 118. Illumination 101 from the illumination source 112 may be directed to a sample 120 via the illumination arm 114.

The metrology sub-system 102 may be configured to collect illumination emanating from the sample via the collection arm 116. The illumination arm 114 pathway may include one or more optical elements 122 suitable for modifying and/or conditioning the illumination 101. For example, the one or more optical elements 122 may include, but are not limited to, one or more polarizers, one or more filters, one or more beam splitters, one or more diffusers, one or more homogenizers, one or more apodizers, one or more beam shapers, one or more lenses, or any combination thereof.

The illumination arm 114 may utilize a first focusing element 124 to focus and/or direct the illumination 101 (e.g., beam) onto the sample 120. In some embodiments, the sample 120 is disposed upon a stage assembly 126 to facilitate movement of sample 120. In some embodiments, the stage assembly 126 is an actuatable stage. For example, the stage assembly 126 may include, but is not limited to, one or more translational stages suitable for selectively translating the sample 120 along one or more linear directions (e.g., x-direction, y-direction and/or z-direction). By way of another example, the stage assembly 126 may include, but is not limited to, one or more rotational stages suitable for selectively rotating the sample 120 along a rotational direction. By way of another example, the stage assembly 126 may include, but is not limited to, a rotational stage and a translational stage suitable for selectively translating the sample 120 along a linear direction and/or rotating the sample 120 along a rotational direction. It is noted herein that the system 100 may operate in any scanning mode known in the art.

The collection arm 116 may include a second focusing element 128 to collect illumination from the sample 120. In another embodiment, the detector assembly 118 is configured to capture illumination emanating from the sample 120 through the collection arm 116. For example, the detector assembly 118 may receive illumination reflected or scattered (e.g., via specular reflection, diffuse reflection, and the like) from the sample 120. By way of another example, the detector assembly 118 may receive illumination generated by the sample 120 (e.g., luminescence associated with absorption of the illumination 101, and the like). It is noted that detector assembly 118 may include any sensor and detector assembly known in the art. The sensor may include, but is not limited to, charge-coupled device (CCD detector), a complementary metal oxide semiconductor (CMOS) detector, a time delay integration (TDI) detector, a photomultiplier tube (PMT), an avalanche photodiode (APD), and the like.

In another embodiment, the controller 104 may acquire one or more measurements of the sample 120. For example, the controller 104 may be configured to collect metrology measurements of the sample 120.

The collection arm 116 may further include collection optics 130 to direct and/or modify illumination collected by the second focusing element 128 including, but not limited to, one or more lenses, one or more filters, one or more polarizers, or one or more phase plates.

As used throughout the present disclosure, the term "sample" generally refers to a substrate formed of a semiconductor or non-semiconductor material (e.g., a wafer, a reticle, or the like). For example, a semiconductor or non-semiconductor material may include, but is not limited to, monocrystalline silicon, gallium arsenide, and indium phosphide. A sample may include one or more layers. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or unpatterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable.

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of metrology sub-system 102 via any wireline or wireless connection known in the art.

In one embodiment, the one or more processors 106 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, detector assembly 118, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the metrology sub-system 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the one or more processors 106. In an alternative embodiment, the memory 108 may be located remotely with respect to the physical location of the processors 106, controller 104, and the like. In another embodiment, the memory 108 maintains program instructions for causing the one or more processors 106 to carry out the various steps described through the present disclosure.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

In one set of embodiments, as illustrated in at least FIGS. 2-5, resolution enhancement may help to reduce the computational time cost and/or computational resource cost of a physical simulation model, where it uses an output at a first grid size of the physical simulation model as input and produces a refined output based on a second grid size.

It is noted herein the physical simulation model, as described throughout the present disclosure, may be a simulation of on-wafer performance applying lithography and/or plasma processes (e.g., etch, deposition, ion implantation, or the like) during microelectronics fabrication.

Figure 2:
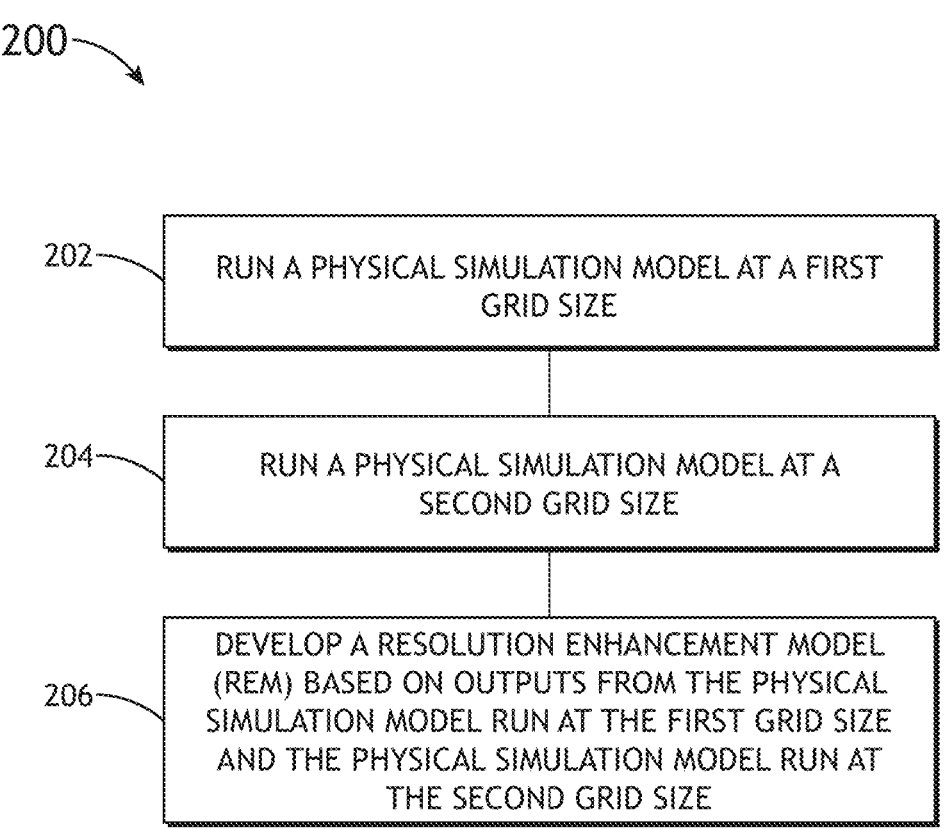
FIG. 2 is a flow diagram illustrating steps performed in a method for accelerating physical simulation models during microelectronic device fabrication, in accordance with one or more embodiments of the present disclosure.
Figure 3:
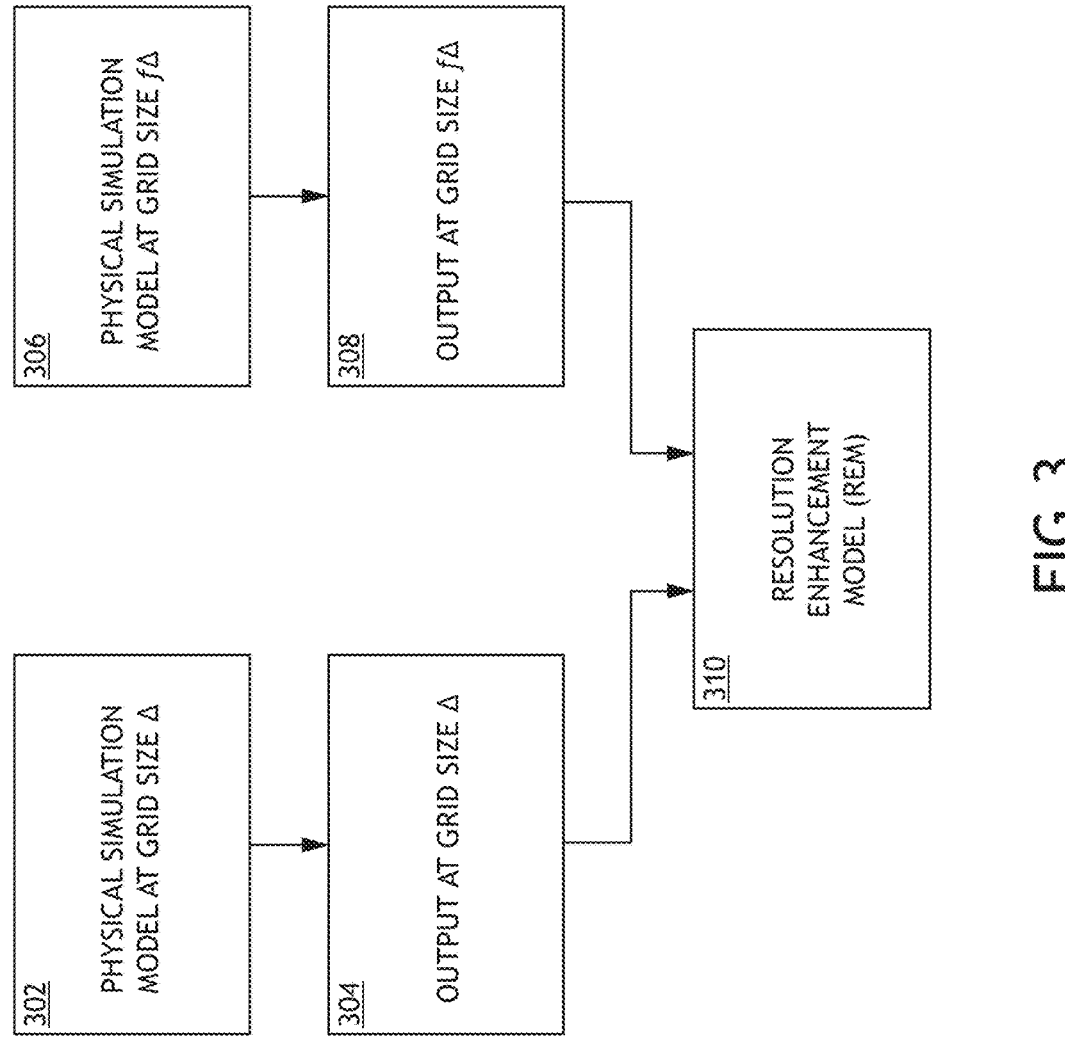
FIG. 3 illustrates a block diagram of a method for accelerating physical simulation models during microelectronic device fabrication, in accordance with one or more embodiments of the present disclosure.

FIG. 2 illustrates a flow diagram depicting a method or process 200 for developing a resolution enhancement model (REM), in accordance with one or more embodiments of the present disclosure. FIG. 3 illustrates a block diagram 300 of the method or process 200 for developing the REM, in accordance with one or more embodiments of the present disclosure. The method or process 200 may utilize information such as one or more measurements from a metrology tool (e.g., the metrology sub-system 102 shown in FIGS. 1A and 1B). In this regard, the method or process 200 may include steps performed by/within the one or more processors 106 of the controller 104.

In a step 202, a physical simulation model may be run at a first grid size. A physical simulation model 302 may include a grid size Δ, where "Δ" is the degree of mesh refinement or grid resolution that is computationally efficient which allows for a faster time-to-solution. Outputs 304 at the grid size Δ may be generated by the physical simulation model 302.

In a step 204, a physical simulation model may be run at a second grid size. A physical simulation model 306 may include a grid size fΔ, where "f" is the degree of mesh refinement or grid resolution utilized to capture a select or desired level of detail in the simulation outputs. For example, "f" may be less than 1.0. Outputs 308 at the grid size fΔ may be generated by the physical simulation model 306.

It is noted herein the physical simulation models 302, 306 used in steps 202 and 204, respectively, may be the same physical simulation model or different physical simulation models. In addition, it is noted herein steps 202 and 204 may be performed in any sequential order or simultaneously.

In a step 206, a REM may be developed based on outputs from the physical simulation model run at the first grid size and the physical simulation model run at the second grid size. Developing the REM 310 may include generating the REM, adjusting the REM, refining the REM, or the like.

Outputs of the physical simulation model run at the Δ grid size may be mapped to the outputs of the physical simulation model run at the fΔ grid size. In one non-limiting example, the outputs of the physical simulation model may be processed to achieve a desired uniformity of the results. For instance, if the output of the physical simulation model is an image, then the image can be optionally manipulated for image sharpness, color depth, color range, or the like. In another non-limiting example, the outputs of the physical simulation model may be enlarged (or shrunk) for purposes of utilization and/or development of the REM.

The REM may be developed using a number of techniques. For example, the REM may be developed using a machine-learning model utilizing any technique known in the art including, but not limited to, supervised learning, unsupervised learning, and the like. For example, the machine-learning model may include learning-based processes including, but not limited to, linear regression, neural networks or deep neural networks, heuristic-based model, or the like. For instance, the heuristics-based model may leverage physical information (e.g., pressure, temperature, gaseous mixture flow, gaseous mixture concentration, or the like) about the processes being modeled.

The REM may be developed through adjustment or refinement (e.g., to a selected amount of optimization) to achieve a desired degree of similarity in the outputs from the REM model. For example, the metrics that describe the degree of similarity may be dependent on the type of data. For instance, the metrics may be based on normalized sum of squared deviations, goodness of fit, and/or other statistical tests including, but not limited to, least squares sum of deviations, signal-to-noise ratio (e.g., (peak, geometric, or the like), structural similarity index measure (and its variants), or any other statistical metric known in the art.

Figure 4:
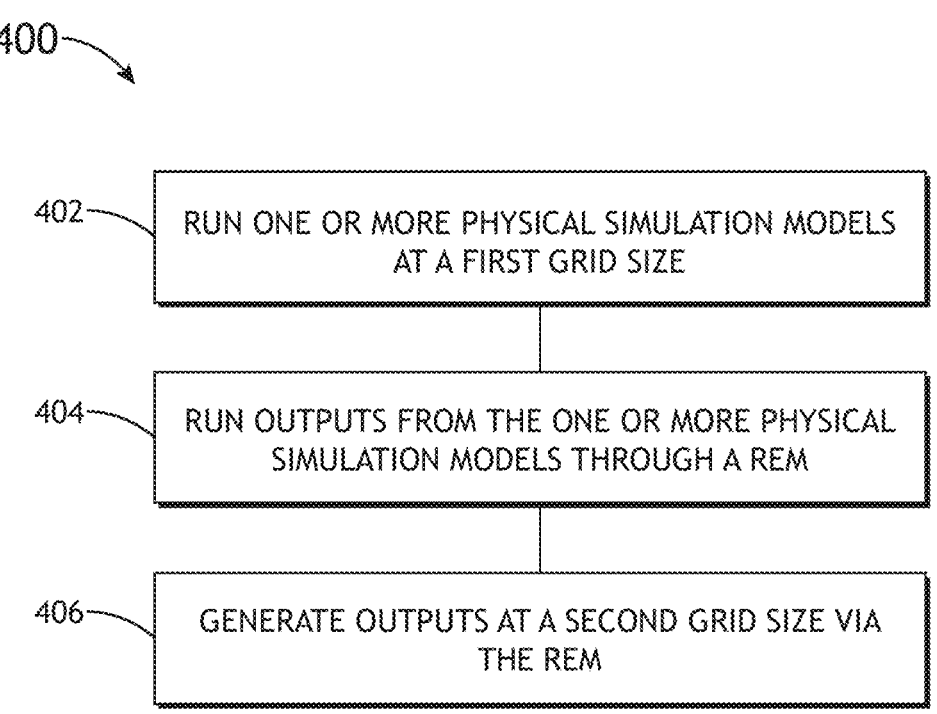
FIG. 4 is a flow diagram illustrating steps performed in a method for accelerating physical simulation models during microelectronic device fabrication, in accordance with one or more embodiments of the present disclosure.
Figure 5:
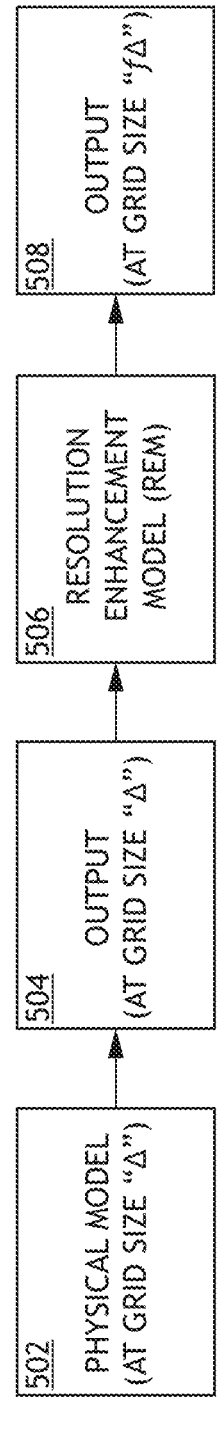
FIG. 5 illustrates a block diagram of a method for accelerating physical simulation models during microelectronic device fabrication, in accordance with one or more embodiments of the present disclosure.

FIG. 4 illustrates a flow diagram depicting a method or process 400 for accelerating physical simulation models during microelectronic device fabrication, in accordance with one or more embodiments of the present disclosure. FIG. 5 illustrates a block diagram 500 of the method or process 400 for accelerating physical simulation models during microelectronic device fabrication, in accordance with one or more embodiments of the present disclosure. The method or process 400 may utilize information such as one or more measurements from a metrology tool (e.g., the metrology sub-system 102 shown in FIGS. 1A and 1B). In this regard, the method or process 400 may include steps performed by/within the one or more processors 106 of the controller 104.

In a step 402, one or more physical simulation models may be run at the first grid size. The one or more physical simulation models 502 may include a grid size Δ, where "Δ" is the degree of mesh refinement or grid resolution that is computationally efficient which allows for a faster time-to-solution. It is noted herein, however, the one or more physical simulation models 502 may be run at a different grid size than Δ (e.g., a δ grid size). In addition, it is noted herein the one or more physical simulation models 502 may be the same or different from the physical simulation models 302, 306. Outputs 504 at the grid size Δ may be generated by the physical simulation model 502.

In a step 404, the outputs from the physical simulation models may be run through a REM. For example, the REM 506 may be developed using one or more steps of the method or process 200.

In a step 406, outputs at a second grid size may be generated via the REM. The REM 506 may generate outputs at a grid size fΔ, where "f" is the degree of mesh refinement or grid resolution utilized to capture a select or desired level of detail in the simulation outputs. For example, "f" may be less than 1.0.

If the outputs at the grid size Δ from step 402 are run through the REM 506 once, the outputs from the REM 506 will have a grid size fΔ, based on the development of the REM 506 (e.g., as illustrated in FIGS. 2 and 3). It is noted herein, however, the REM 506 may be utilized multiple times to generate outputs with a degree of refinement lower than "f". For example, an "p" number of passes through the REM 506 may produce an output corresponding to a grid size of "f^p Δ". For instance, 2 passes through the REM 506 may produce an output corresponding to a grid size of "f^2 Δ".

Although it is illustrated in FIGS. 2-5 that outputs of a physical simulation model are inputted into the REM, it is noted herein that the REM is not limited to outputs of a physical simulation model being inputted once the REM is developed.

Figure 6:
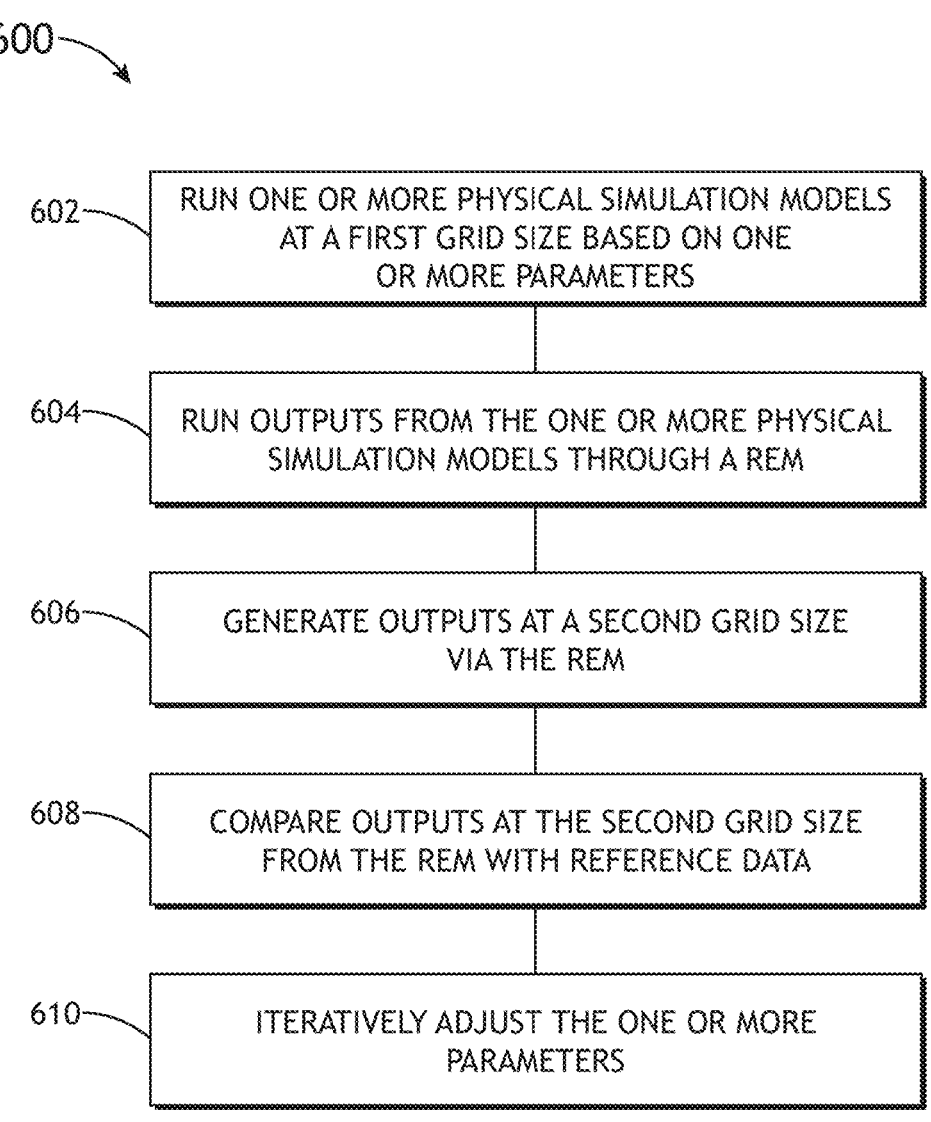
FIG. 6 is a flow diagram illustrating steps performed in a method for accelerating physical simulation models during microelectronic device fabrication, in accordance with one or more embodiments of the present disclosure.
Figure 7:
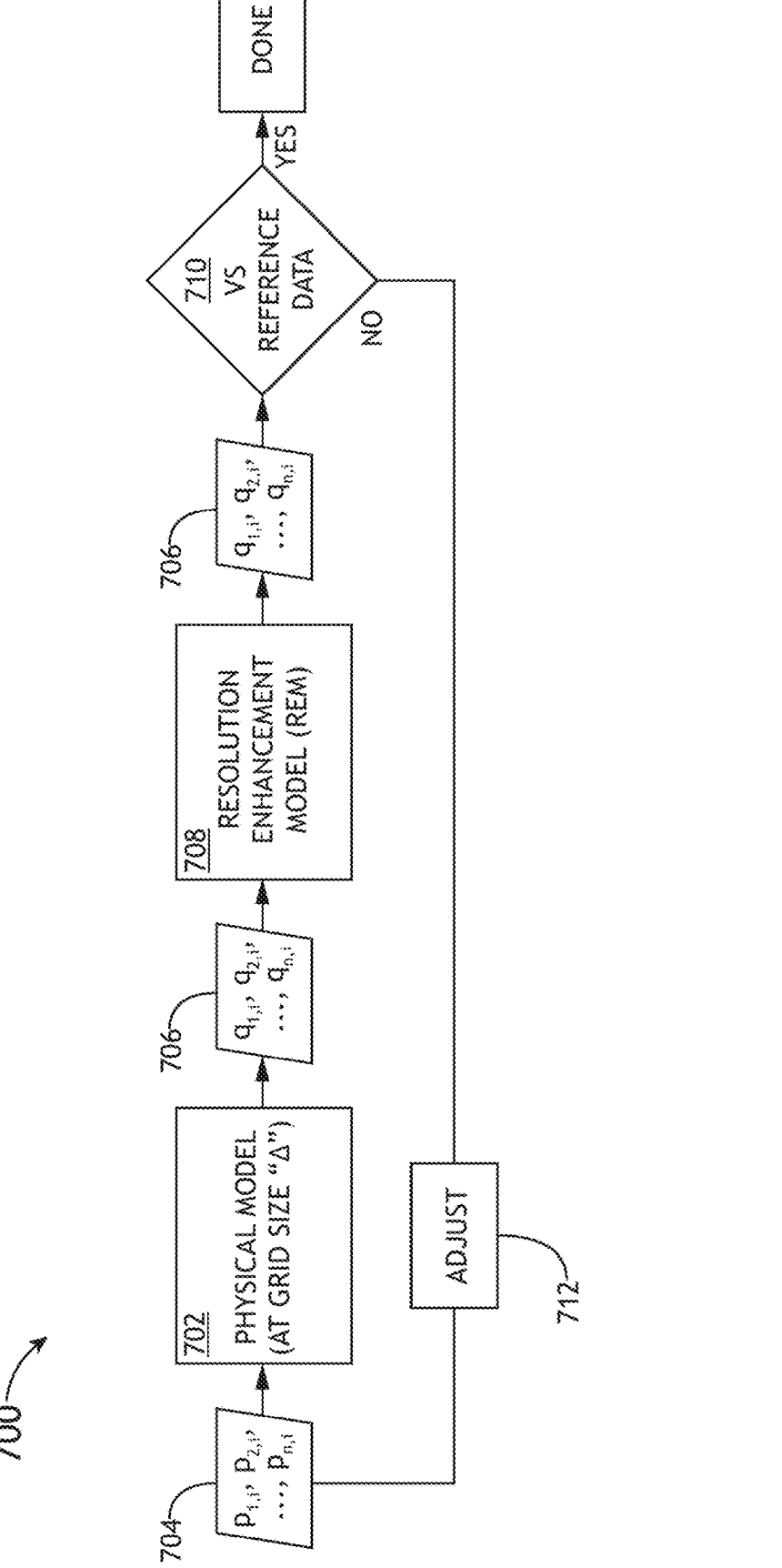
FIG. 7 illustrates a block diagram a block diagram of a method for accelerating physical simulation models during microelectronic device fabrication, in accordance with one or more embodiments of the present disclosure.

In another set of embodiments, as illustrated in at least FIGS. 6 and 7, an iterative optimization algorithm may be utilized in combination with the methods or processes 200 and/or 400 to adjust or refine (e.g., to a select amount of optimization) parameters in the physical simulation model, so the outputs resemble between 50 and 100 percent of a set of reference data. For example, the reference data may be experimentally collected by the system 100 (e.g., as images, probe measurements, optical measurements, scattering patterns, or the like), and/or may be outputs of another physical simulation model. For purposes of the present embodiment, the outputs resembling at or near 100 percent may indicate a perfect match to the reference data, while the outputs resembling at or near 50 percent may indicate the outputs are a factor of ±0.5 of the reference data.

FIG. 6 illustrates a method or process 600 for accelerating physical simulation models during microelectronic device fabrication, in accordance with one or more embodiments of the present disclosure. FIG. 7 illustrates a block diagram 700 of the method or process 600 for accelerating physical simulation models during microelectronic device fabrication, in accordance with one or more embodiments of the present disclosure. The method or process 600 may utilize information such as one or more measurements from a metrology tool (e.g., the metrology sub-system 102 shown in FIGS. 1A and 1B). In this regard, the method or process 600 may include steps performed by/within the one or more processors 106 of the controller 104.

In a step 602, one or more physical simulation models may be run at a first grid size based on one or more parameters. The one or more physical simulation models 702 may include a grid size $\Delta$, where "$\Delta$" is the degree of mesh refinement or grid resolution that is computationally efficient which allows for a faster time-to-solution. In addition, it is noted herein the one or more physical simulation models 702 may be the same or different from the physical simulation models 302, 306, 502.

The one or more physical simulation models 702 may be run based on one or more parameters 704 (e.g., $p_j$), where j ranges between 1, 2, . . . , n. For example, the one or more parameters 704 (e.g., $p_1$, $p_2$, . . . , $p_n$) may be parameters selected to be optimized. It is noted herein the initial values for the one or more parameters 704 (e.g., $p_1$, $p_2$, . . . , $p_n$) may be estimated, or received from third-parties.

Outputs 706 at the grid size $\Delta$ may be generated by the physical simulation model 702. The outputs 706 (e.g., $q_{j,i}$) may include the outputs list j generated through the physical simulation model for different conditions i, or a combination of different conditions, where i ranges between 1, 2, . . . , m. For example, the outputs 706 (e.g., $q_{1,i}$, $q_{2,i}$, . . . , $q_{n,i}$) may be output at a grid size of $\Delta$. It is noted herein n (e.g., with respect to j) and m (e.g., with respect to i) may be the same or different.

In a step 604, the outputs from the physical simulation models may be run through a REM. For example, the REM 708 may be developed using one or more steps of the method or process 200.

In a step 606, outputs at a second grid size may be generated via the REM. The outputs 706 (e.g., $q_{j,i}$) from the physical simulation model 702 may be input into the REM 708, which may generate outputs 706 (e.g., $q_{j,i}$) with an increased-resolution grid size of f$\Delta$, where "f" is the degree of mesh refinement or grid resolution utilized to capture a select or desired level of detail in the simulation outputs. For example, "f" may be less than 1.0.

In a step 608, the outputs from the REM at the second grid size may be compared to reference data. The outputs 706 (e.g., $q_{j,i}$) at the increased-resolution grid size of f$\Delta$ may be compared to reference data 710 until the outputs 706 (e.g., $q_{j,i}$) at the increased-resolution grid size of f$\Delta$ are within a desired mismatch tolerance or threshold of the corresponding reference data 710. For example, the mismatch tolerance or threshold may vary between 0 (e.g., where the outputs resembling at or near 100 percent may indicate a perfect match to the reference data) and 50 percent (e.g., where the outputs resembling at or near 50 percent to the reference data).

In a step 610, the one or more parameters may be iteratively adjusted. If the outputs 706 (e.g., $q_{j,i}$) at the increased-resolution grid size of f$\Delta$ are outside (e.g., not within) a desired mismatch tolerance or threshold, the model parameters 704 (e.g., $p_j$) may be iteratively adjusted and outputs 706 from the physical simulation model 702 may be re-run through the REM. In contrast, if the outputs 706 (e.g., $q_{j,i}$) at the increased-resolution grid size of f$\Delta$ are within a desired mismatch tolerance or threshold, the method or process 600 is completed.

Figure 8:
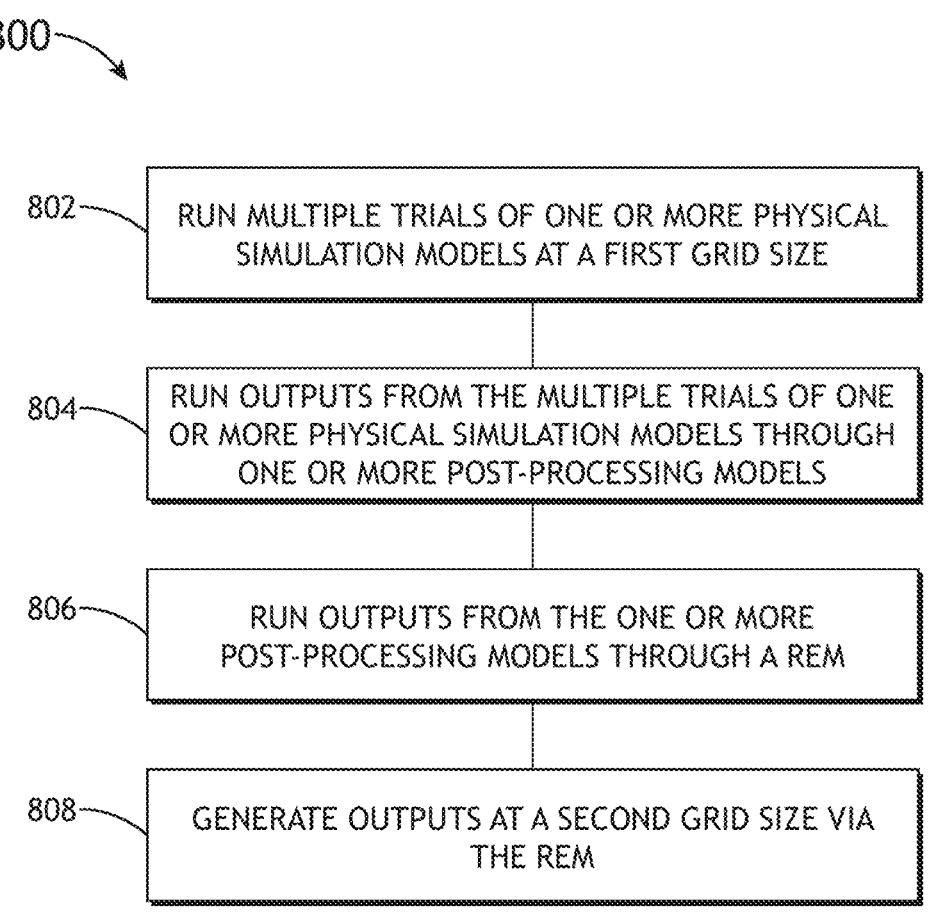
FIG. 8 is a flow diagram illustrating steps performed in a method for accelerating physical simulation models during microelectronic device fabrication, in accordance with one or more embodiments of the present disclosure.
Figure 9:
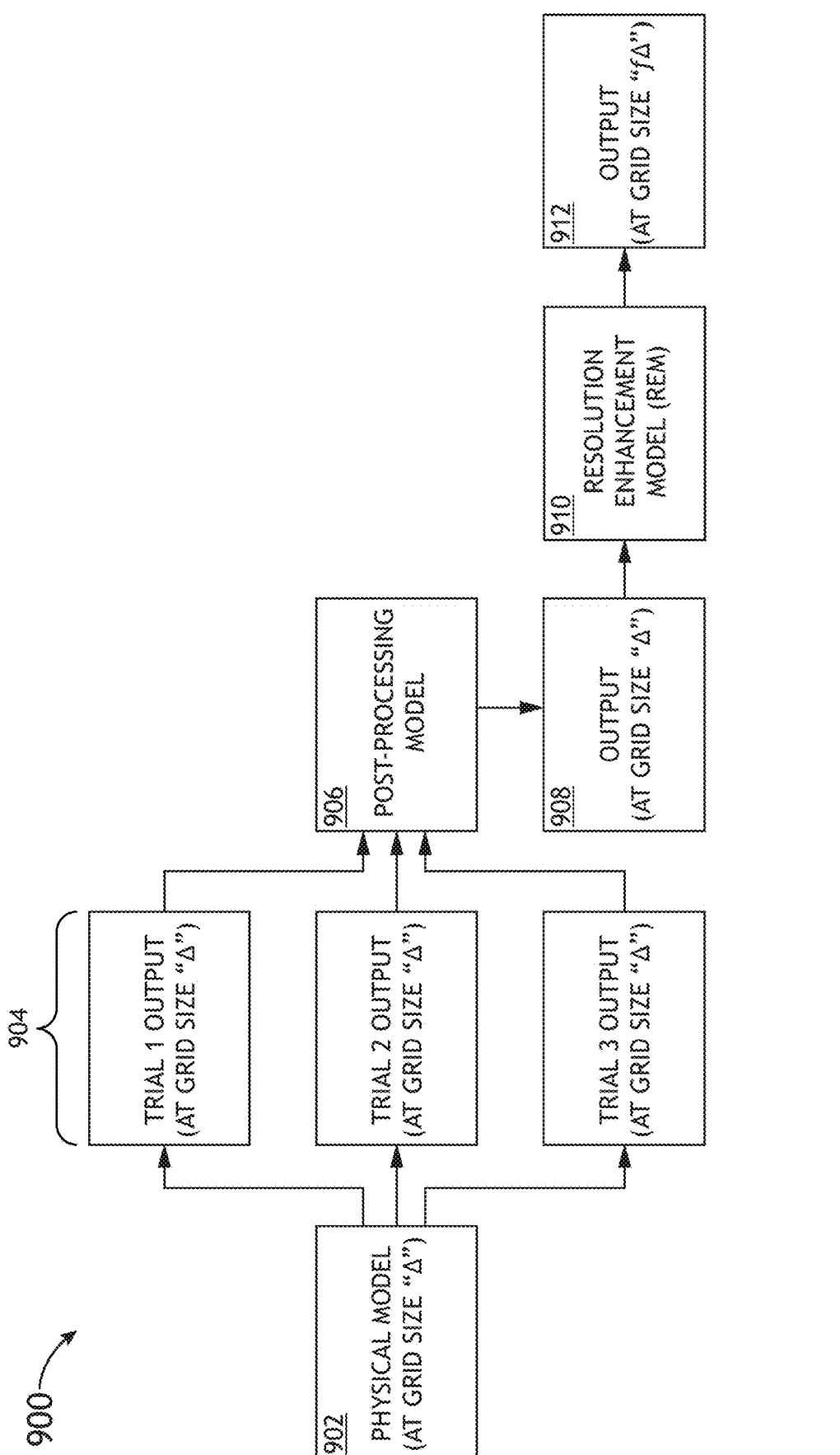
FIG. 9 illustrates a block diagram of a method for accelerating physical simulation models during microelectronic device fabrication, in accordance with one or more embodiments of the present disclosure.

In another set of embodiments, as illustrated in at least FIGS. 8 and 9, a post-processing procedure may be utilized in combination with the methods or processes 200, 400, and/or 600 and applied to the outputs of a physical simulation model. For example, the post-processing procedure may include, but is not limited to, a Monte Carlo simulation which utilizes randomness to solve problems that are otherwise deterministic but may generate results that have a probabilistic interpretation.

FIG. 8 illustrates a method or process 800 for accelerating physical simulation models during microelectronic device fabrication, in accordance with one or more embodiments of the present disclosure. FIG. 9 illustrates a block diagram 900 of the method or process 800 for accelerating physical simulation models during microelectronic device fabrication, in accordance with one or more embodiments of the present disclosure. The method or process 800 may utilize information such as one or more measurements from a metrology tool (e.g., the metrology sub-system 102 shown in FIGS. 1A and 1B). In this regard, the method or process 800 may include steps performed by/within the one or more processors 106 of the controller 104.

In a step 802, multiple trials of one or more physical simulation models at a first grid size may be run. The one or more physical simulation models 902 may include a grid size $\Delta$, where "$\Delta$" is the degree of mesh refinement or grid resolution that is computationally efficient which allows for a faster time-to-solution. In addition, it is noted herein the one or more physical simulation models 902 may be the same or different from the physical simulation models 302, 306, 502, 702.

In order to consider all probable scenarios, multiple trials may be performed using the physical simulation model 902 at the grid size $\Delta$ (e.g., for the same or similar conditions or inputs). Outputs 904 at the grid size $\Delta$ of the one or more physical simulation models 902 may be generated.

In a step 804, outputs from the multiple trials of one or more physical simulation models may be run through one or more post-processing models. The outputs 904 of the multiple trials may be run through one or more post-processing models 906. For example, the one or more post-processing models 906 may manipulate the outputs 904 of the multiple trials for image sharpness, color depth, color range, or the like. By way of another example, the one or more post-processing models 906 may include a Monte Carlo simulation. The one or more post-processing models 906 may generate one or more probabilistic outputs 908 for the multiple trials. With this, the probabilistic distribution of the outputs 904 at the grid size $\Delta$ of the one or more physical simulation models 902 may be determined. It is noted herein the outputs of the multiple physical simulation models may be run through the post-processing model together or in batches of one or more (e.g., up to the entire set of outputs).

In a step 806, outputs from the one or more post-processing models may be run through a REM. The probabilistic outputs 908 at the grid size $\Delta$ from the one or more post-processing models 906 may be run through a REM 910. For example, the REM 910 may be developed using one or more steps of the method or process 200.

In a step 808, outputs at a second grid size may be generated via the REM. The REM 910 may generate outputs 912 at a grid size f$\Delta$, where "f" is the degree of mesh refinement or grid resolution utilized to capture a select or desired level of detail in the simulation outputs. For example, "f" may be less than 1.0. It is noted herein the probabilistic outputs 908 may be run through the REM 910 together or in batches of one or more (e.g., up to the entire set of outputs). In this regard, the output 912 at the grid size f$\Delta$ may include a distribution corresponding to the outputs 908 generated by the one or more post-processing models 906, where the one or more post-processing models receive the outputs 904 of the multiple trials.

Figure 10:
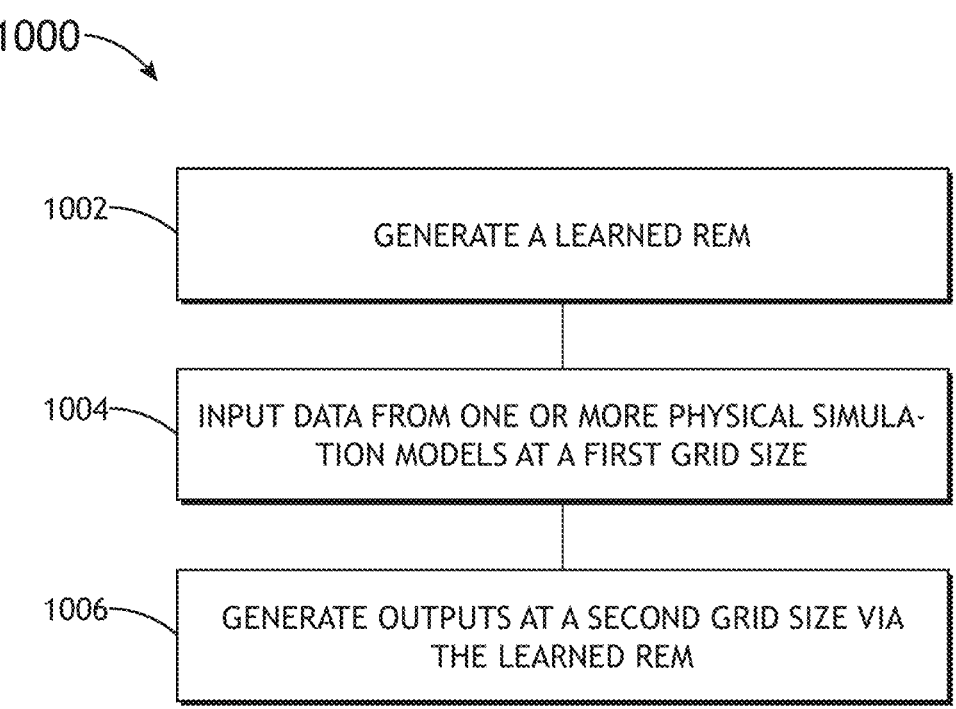
FIG. 10 is a flow diagram illustrating steps performed in a method for accelerating physical simulation models during microelectronic device fabrication, in accordance with one or more embodiments of the present disclosure.
Figure 11A:
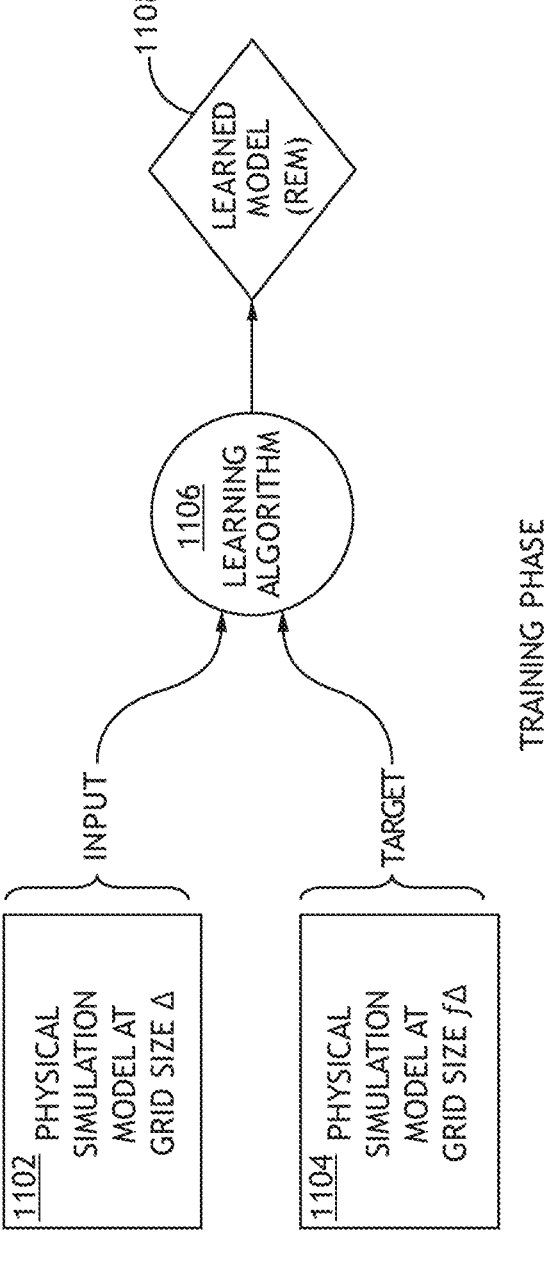
FIG. 11A illustrates a simplified block diagram of a training phase for accelerating physical simulation models during microelectronic device fabrication, in accordance with one or more embodiments of the present disclosure.
Figure 11B:
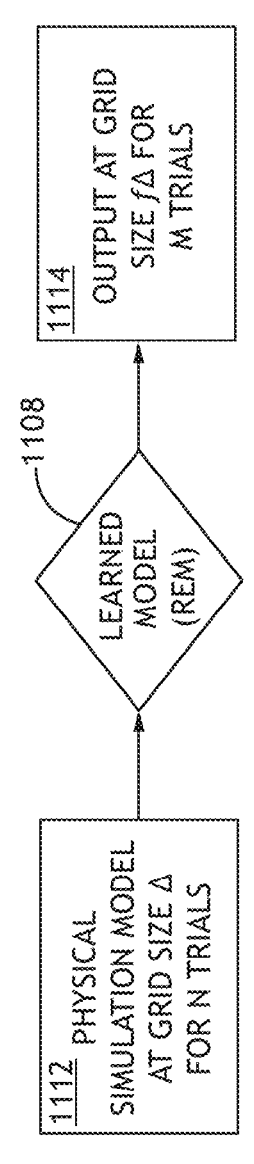
FIG. 11B illustrates a simplified block diagram of a testing/production phase for accelerating physical simulation models during microelectronic device fabrication, in accordance with one or more embodiments of the present disclosure.
Figure 11B:

In another set of embodiments, as illustrated in at least FIGS. 10-11B, the REM may be trained at a machine learning model, which may be utilized in combination with the methods or processes 200, 400, 600, and/or 800.

FIG. 10 illustrates a method or process 1000 for accelerating physical simulation models during microelectronic device fabrication, in accordance with one or more embodiments of the present disclosure. FIGS. 11A and 11B illustrate schematics 1100 and 1110 of the method or process 1000 for accelerating physical simulation models during microelectronic device fabrication, in accordance with one or more embodiments of the present disclosure. The method or process 1000 may utilize information such as one or more measurements from a metrology tool (e.g., the metrology sub-system 102 shown in FIGS. 1A and 1B). In this regard, the method or process 1000 may include steps performed by/within the one or more processors 106 of the controller 104.

During a training phase 1100 illustrated in FIG. 11A, in a step 1002 a learned REM is generated. One or more physical simulation models 1102 generating outputs at a first grid size and one or more physical simulation models 1104 generating outputs at a second grid size may be input into a learning algorithm 1106. A physical simulation model 1102 may include a grid size $\Delta$, where "$\Delta$" is the degree of mesh refinement or grid resolution that is computationally efficient which allows for a faster time-to-solution. A physical simulation model 1104 may include a grid size f$\Delta$, where "f" is the degree of mesh refinement or grid resolution utilized to capture a select or desired level of detail in the simulation outputs. For example, "f" may be less than 1.0. Outputs at the grid size $\Delta$ may be the input information, and outputs at the grid size f$\Delta$ may be the target information.

The learning algorithm 1106 may implement a machine-learning model utilizing any technique known in the art including, but not limited to, supervised learning, unsupervised learning, and the like. For example, the machine-learning model may include learning-based processes (e.g., linear regression, neural networks or deep neural networks, heuristic-based model, or the like) configured to generate a learned REM 1108. For instance, the heuristics-based model may leverage physical information about the processes being modeled.

During a testing/production phase 1110 illustrated in FIG. 11B, in a step 1004 data from one or more physical simulation models at a first grid size is input. Data from one or more physical simulation models 1112 generating outputs at a first grid size for n trials may be input into the learned REM 1108. In a step 1006, outputs at a second grid size are generated via the learned REM. the learned REM 1108 may generate outputs 1114 with grid size f$\Delta$ for m trials. It is noted herein "n" may range between four and 1 trillion (e.g., at a low resolution), while "m" may range between one and 10000 (e.g., at a high resolution). In addition, it is noted herein that a subset of "n" trials may equate to a single output through the REM. In one non-limiting example, it is noted herein four images (or n=4) at the low resolution A may equate to one image (or m=1) at the high resolution f$\Delta$.

A description of learning-based processes is found in D. C. Montgomery, et al., *Introduction to Linear Regression Analysis*, New York: Wiley, 2001, which is incorporated herein by reference in the entirety. In addition, a description of learning-based processes is found in I. Goodfellow, et al., *Deep Learning*, The MIT Press, 2016, which is incorporated herein by reference in the entirety.

It is noted that the embodiments and enabling technologies described previously herein in the context of system 100 should be interpreted to extend to the methods or processes 200, 400, 600, 800, 1000, 1000. In this regard, the steps of methods or processes 200, 400, 600, 800, 1000 may be carried out by system 100, and the methods or processes 200, 400, 600, 800, 1000 may further include one or more steps required or implied by the architecture of system 100. However, the methods or processes 200, 400, 600, 800, 1000 is not limited to the architecture of system 100, and it is recognized that one or more steps of methods or processes 200, 400, 600, 800, 1000, or portions thereof, may be carried out with alternative system components and/or architecture. Furthermore, the steps of methods or processes 200, 400, 600, 800, 1000 can be carried out in any order unless otherwise specified herein.

In one non-limiting example, in an optional step to any of the methods or processes 200, 400, 600, 800, 1000, one or more control signals are configured to selectively adjust one or more characteristics of one or more process tools based on the REM. The system 100 may further include one or more process tools communicatively coupled to the controller 104. For example, the one or more process tools may include any process tool for microelectronics fabrication known in the art including, but not limited to, a lithography tool and/or a plasma process tool (e.g., an etching tool, a deposition tool, a polishing tool, a scanner, or the like). The controller 104 may be configured to generate one or more control signals configured to adjust one or more characteristics of one or more process tools in a feed-forward or a feed-back loop based on the REM.

In another non-limiting example, in an optional step one or more control signals are configured to selectively adjust one or more characteristics of the metrology sub-system 102 of the system 100 based on the REM.

It is noted herein the methods or processes 200, 400, 600, 800, 1000 are not limited to the steps and/or sub-steps provided. The methods or processes 200, 400, 600, 800, 1000 may include more or fewer steps and/or sub-steps. The methods or processes 200, 400, 600, 800, 1000 may perform the steps and/or sub-steps simultaneously. The methods or processes 200, 400, 600, 800, 1000 may perform the steps and/or sub-steps sequentially, including in the order provided or an order other than provided. Therefore, the above description should not be interpreted as a limitation on the scope of the present disclosure but merely an illustration.

In one non-limiting example, outputs from a physical simulation model at a high-resolution grid size f$\Delta$ and outputs from a physical simulation model at a low-resolution grid size $\Delta$ may be received or generated. In this example, the outputs may be in the form of an image of an etch process. However, the output may not be a raw image, but instead can be pre-processed and/or be represented by a list of parameters (e.g., $p_j$) that enables a faithful reconstruction of the typical output of the physical model. In addition, it is noted herein the physical model may be similarly utilized for an alternative on-wafer process including, but not limited to, deposition and/or lithography or any other physical model.

An REM may be generated with any combination of the methods or processes 200, 400, 600, 800, 1000. For example, the REM may be generated by mapping outputs from a physical simulation model at the high-resolution grid size f$\Delta$ to outputs from a physical simulation model at a low-resolution grid size $\Delta$. For instance, the mapping may require a training of the REM with a learning algorithm as described with respect to the method or process 1000.

Figure 12:
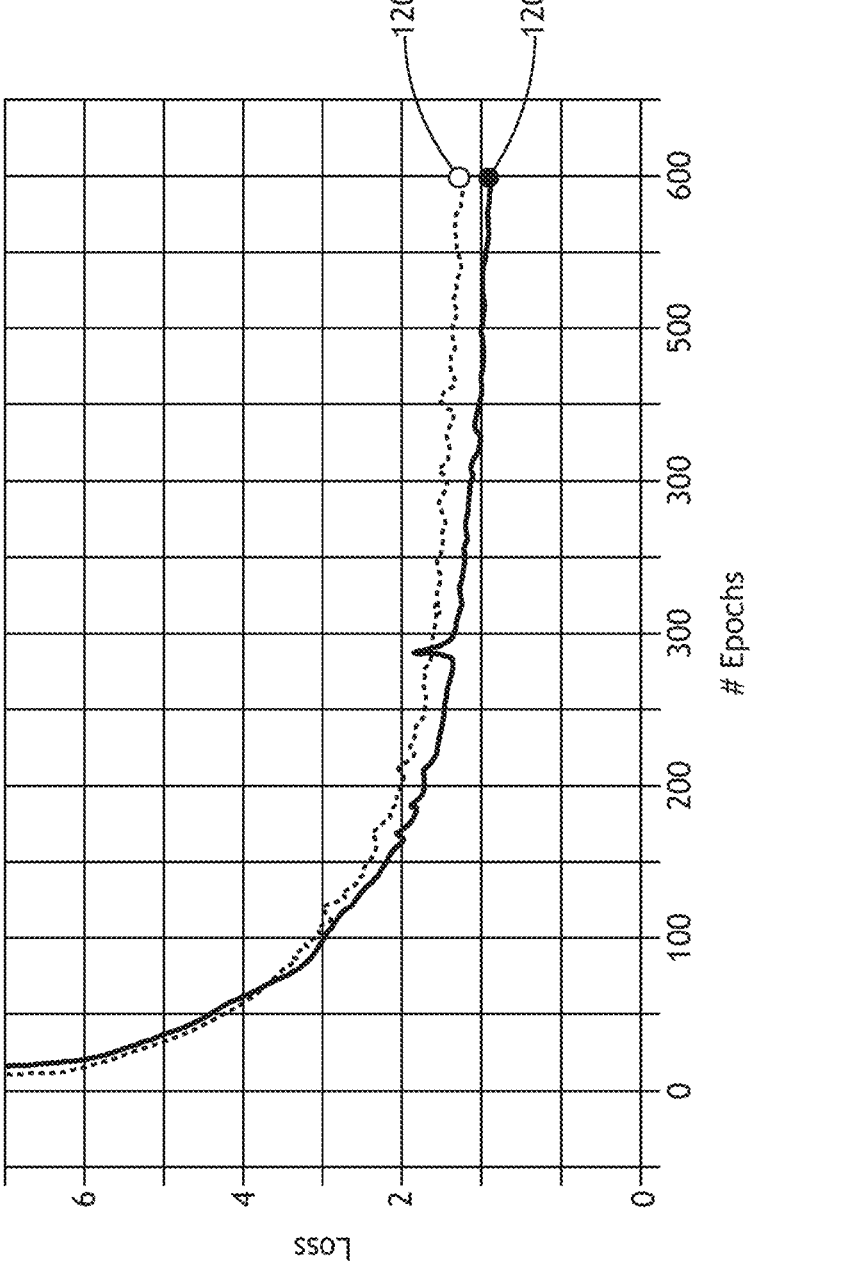
FIG. 12 illustrates a graph comparing validation loss and training loss when training a resolution enhancement model (REM), in accordance with one or more embodiments of the present disclosure.

FIG. 12 illustrates a graph 1200 comparing validation loss 1202 and training loss 1204. As illustrated in graph 1200, both the validation loss 1202 and the training loss 1204 decrease with an increased number of training epochs. When the validation loss 1202 reaches a select threshold or saturates, the training of the REM may be considered to be completed. It is noted herein the select threshold may vary. In addition, it is noted herein the range of the select threshold may depend on one or more requirements of a training model and/or a loss function (or functions) being applied during the training of the REM. For example, the range of the select threshold may be between $10e^{-5}$ and $10e^{5}$.

Following the training of the REM, the image outputs from a physical simulation model at grid size $\Delta$ may be utilized in the REM to produce outputs corresponding to the outputs of the physical simulation model at grid size f$\Delta$. For example, if the grid size $\Delta$ is 2 nanometers (nm) and f is 0.25, the output of the REM is a grid size of 0.5 nm.

Figure 13:
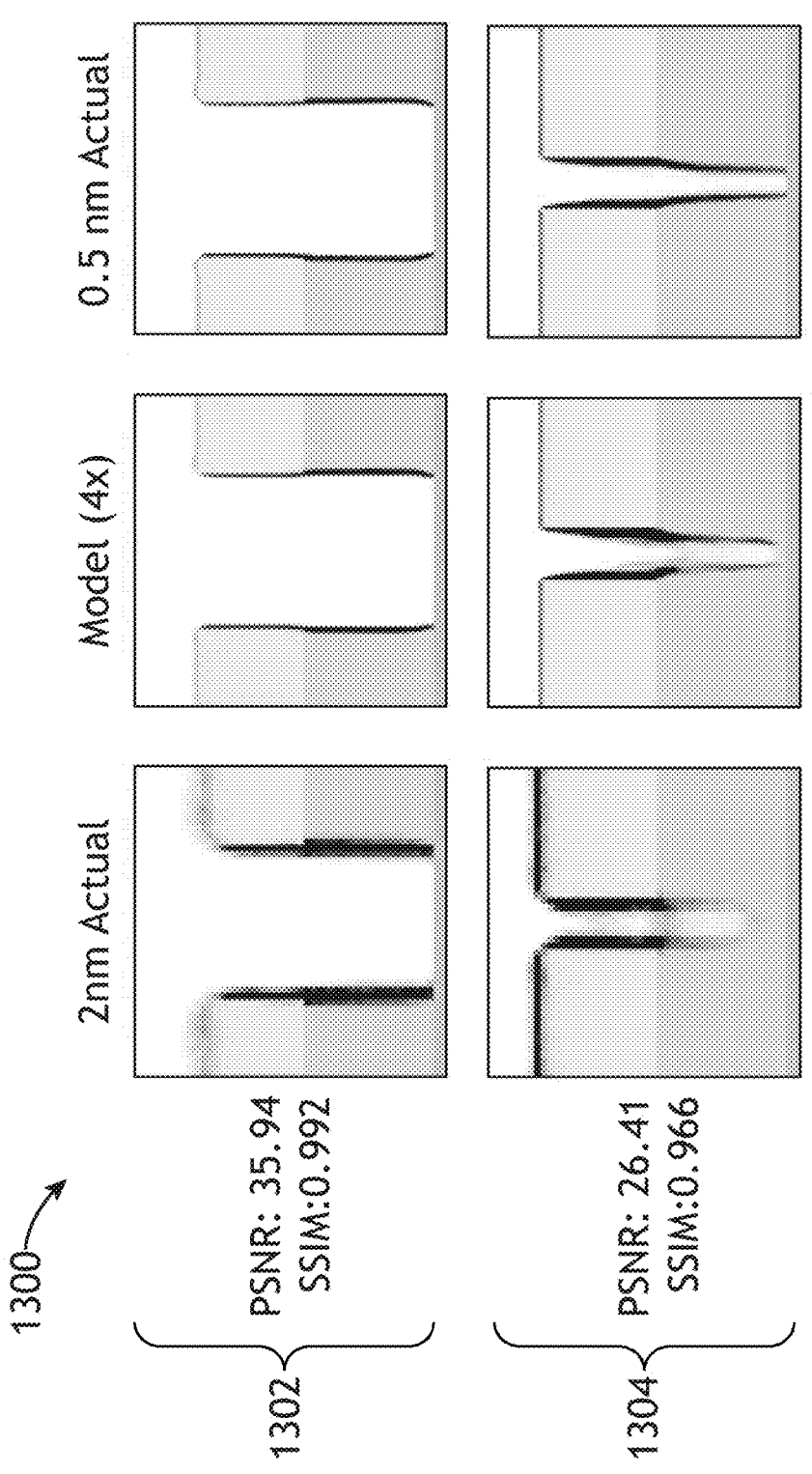
FIG. 13 illustrates a set comparing coarse resolution images and REM-generated versions of the coarse resolution images for comparison against fine resolution images for two patterns, in accordance with one or more embodiments of the present disclosure.

FIG. 13 is a set of images 1300 including coarse resolution images of 2 nm and fine resolution images of 0.5 nm are obtained from the system 100 (e.g., from the metrology subsystem 102) for two different patterns 1302, 1304. The set of images 1300 compare a real physical model at 2 nm, a real physical model at 0.5 nm, and an image generated by the REM with a 4x resolution increase from the real physical model at 2 nm for each of the two different patterns 1302, 1304. As can be seen from the comparisons, the 4× resolution increase image generated by the REM of the real physical model at 2 nm accurately captures attributes of the real physical model at 0.5 nm—however, the ability to utilize the REM may greatly reduce the computational time and/or cost that would otherwise be required if images were taken at the 0.5 nm resolution. It is noted herein metrics of both peak signal-to-noise ratio (PSNR) and structural similarity index measure (SSIM) are provided to describe the degree of similarity of the 4× resolution increase of the REM output and the real physical model at 0.5 nm.

In this regard, the present disclosure has a number of advantages over conventional systems and methods. Embodiments of the present disclosure are directed to a combination of physical modeling with an acceleration technique to enable higher level of details. Embodiments of the present disclosure are directed to a combination of physical modeling with image-based techniques. Embodiments of the present disclosure are directed to a combination of physical modeling with learning algorithms. Embodiments of the present disclosure are directed to accelerating demo cycle by utilizing a priori generated data from physical simulation models. Embodiments of the present disclosure are directed to generating probabilistic distributions (e.g., such as a Monte Carlo method) at finer grid resolutions without increasing computational burden.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:

a controller, wherein the controller includes one or more processors and memory, wherein the memory is configured to store program instructions, wherein the one or more processors are configured to execute the program instructions causing the one or more processors to:

run a physical simulation model at a first grid size having a first resolution, wherein the physical simulation model simulates an on-wafer performance of at least one microelectronics fabrication process;

generate outputs at the first grid size having the first resolution from the physical simulation model;

input the outputs at the first grid size having the first resolution from the physical simulation model into a resolution enhancement model (REM); and generate outputs at a second grid size having a second resolution via the REM, wherein the second grid size is smaller than the first grid size, wherein the second resolution is higher than the first resolution; and adjusting the REM to achieve a desired degree of similarity of the outputs of the REM model, wherein the generation of the outputs at the second grid size having the second resolution via the REM based on the outputs at the first grid size having the first resolution from the physical simulation model reduces at least one of a computational time cost or a computational resource cost of the controller to run the physical simulation model.

2. The system of claim 1, wherein the outputs at the first grid size having the first resolution from the physical simulation model include one or more images having the first resolution, wherein the outputs at the second grid size having the second resolution generated via the REM include one or more images having the second resolution.

3. The system of claim 1, wherein the first grid size is Δ, wherein the second grid size is fΔ, wherein f is less than 1.0.

4. The system of claim 1, wherein the controller is further configured to:

run the physical simulation model at the first grid size having the first resolution;

run the physical simulation model at the second grid size having the second resolution; and develop the REM based on outputs from the physical simulation model run at the first grid size having the first resolution and the physical simulation model run at the second grid size having the second resolution.

5. The system of claim 4, wherein the controller is further configured to:

develop the REM through a training process of at least one of a deep learning model, a machine learning model, or a heuristics-based model.

6. The system of claim 5, wherein the controller is further configured to:

run the physical simulation model at the first grid size having the first resolution for an n number of trials; and generate an m number of outputs at the second grid size having the second resolution from the REM, wherein m is less than n.

7. The system of claim 5, wherein a subset of an n number of trials equates to a single output through the REM.

8. The system of claim 1, wherein the controller is further configured to:

compare the outputs at the second grid size having the second resolution generated by the REM to the set of reference data to determine whether the outputs at the second grid size having the second resolution are within a select mismatch tolerance; and iteratively adjust one or more parameters of the physical simulation model when the outputs at the second grid size having the second resolution are outside of the select mismatch tolerance.

9. The system of claim 8, wherein the controller is further configured to:

obtain the set of reference data from a metrology subsystem.

10. The system of claim 1, wherein the controller is further configured to:

run a plurality of trials of the physical simulation model at the first grid size having the first resolution to produce a probabilistic distribution of the plurality of trials;

generate a plurality of outputs at the first grid size having the first resolution from the plurality of trials of the physical simulation model;

run the plurality of outputs at the first grid size having the first resolution through a post-processing model;

generate a plurality of post-processing model outputs at the first grid size having the first resolution via the post-processing model;

run the plurality of post-processing model outputs at the first grid size having the first resolution through the REM; and generate a plurality of outputs at the second grid size having the second resolution from the REM.

11. The system of claim 10, wherein the post-processing model includes a Monte Carlo simulation.

12. A method comprising:

running a physical simulation model at a first grid size having a first resolution, wherein the physical simulation model simulates an on-wafer performance of at least one microelectronics fabrication process;

generating outputs at the first grid size having the first resolution from the physical simulation model;

inputting the outputs at the first grid size having the first resolution from the physical simulation model into a resolution enhancement model (REM); and generating outputs at a second grid size having a second resolution via the REM, wherein the second grid size is smaller than the first grid size, wherein the second resolution is higher than the first resolution; and adjusting the REM to achieve a desired degree of similarity of the outputs of the REM model, wherein the generation of the outputs at the second grid size having the second resolution via the REM based on the outputs at the first grid size having the first resolution from the physical simulation model reduces at least one of a computational time cost or a computational resource cost of a controller running the physical simulation model.

13. The method of claim 12, wherein the outputs at the first grid size having the first resolution from the physical simulation model include one or more images having the first resolution, wherein the outputs at the second grid size having the second resolution generated via the REM include one or more images having the second resolution.

14. The method of claim 12, wherein the first grid size is Δ, wherein the second grid size is fΔ, wherein f is less than 1.0.

15. The method of claim 12, further comprising:

running a physical simulation model at the first grid size having the first resolution;

running the physical simulation model at the second grid size having the second resolution; and developing the REM based on outputs from the physical simulation model run at the first grid size having the first resolution and the physical simulation model run at the second grid size having the second resolution.

16. The method of claim 15, further comprising:

developing the REM through a training process of at least one of a deep learning model, a machine learning model, or a heuristics-based model.

17. The method of claim 16, further comprising:

running a physical simulation model at the first grid size having the first resolution for an n number of trials; and generating an m number of outputs at the second grid size having the second resolution from the REM, wherein m is less than n.

18. The method of claim 16, wherein a subset of an n number of trials equates to a single output through the REM.

19. The method of claim 12, further comprising:

comparing the outputs at the second grid size having the second resolution generated by the REM to the set of reference data to determine whether the outputs at the second grid size having the second resolution are within a select mismatch tolerance; and iteratively adjusting one or more parameters of the physical simulation model when the outputs at the second grid size having the second resolution are outside of the select mismatch tolerance.

20. The method of claim 19, further comprising:

obtaining the set of reference data from a metrology subsystem.

21. The method of claim 12, further comprising:

running a plurality of trials of the physical simulation model at the first grid size having the first resolution to produce a probabilistic distribution of the plurality of trials;

generating a plurality of outputs at the first grid size having the first resolution from the plurality of trials of the physical simulation model;

running the plurality of outputs at the first grid size having the first resolution through a post-processing model;

generating a plurality of post-processing model outputs at the first grid size having the first resolution via the post-processing model;

running the plurality of post-processing model outputs at the first grid size having the first resolution through the REM; and generating a plurality of outputs at the second grid size having the second resolution from the REM.

22. The method of claim 21, wherein the post-processing model includes a Monte Carlo simulation.

23. A system, comprising:

a metrology subsystem configured to acquire one or more measurements of a portion of a sample; and a controller communicatively coupled to, wherein the controller includes one or more processors and memory, wherein the memory is configured to store program instructions, wherein the one or more processors are configured to execute the program instructions causing the one or more processors to:

obtain one or more inputs from the metrology subsystem, wherein the one or more inputs include images having a first resolution;

run the physical simulation model at a first grid size having the first resolution, wherein the physical simulation model simulates an on-wafer performance of at least one microelectronics fabrication process;

generate outputs at the first grid size having the first resolution from the physical simulation model;

input the outputs at the first grid size having the first resolution from the physical simulation model into a resolution enhancement model (REM); and generate outputs at a second grid size having a second resolution via the REM, wherein the second grid size is smaller than the first grid size, wherein the second resolution is higher than the first resolution; and adjusting the REM to achieve a desired degree of similarity of the outputs of the REM model, wherein the generation of the outputs at the second grid size having the second resolution via the REM based on the outputs at the first grid size having the first resolution from the physical simulation model reduces at least one of a computational time cost or a computational resource cost of the controller to run the physical simulation model.

24. The system of claim 23, wherein the outputs at the first grid size having the first resolution from the physical simulation model include one or more images having the first resolution, wherein the outputs at the second grid size having the second resolution generated via the REM include one or more images having the second resolution.

25. The system of claim 23, wherein the first grid size is Δ, wherein the second grid size is fΔ, wherein f is less than 1.0.

26. The system of claim 23, wherein the controller is further configured to:

run the physical simulation model at the first grid size having the first resolution;

run the physical simulation model at the second grid size having the second resolution; and develop the REM based on outputs from the physical simulation model run at the first grid size having the first resolution and the physical simulation model run at the second grid size having the second resolution.

27. The system of claim 26, wherein the controller is further configured to:

develop the REM through a training process of at least one of a deep learning model, a machine learning model, or a heuristics-based model.

28. The system of claim 27, wherein the controller is further configured to:

run the physical simulation model at the first grid size having the first resolution for an n number of trials; and generate an m number of outputs at the second grid size having the second resolution from the REM, wherein m is less than n.

29. The system of claim 27, wherein a subset of an n number of trials equates to a single output through the REM.

30. The system of claim 23, wherein the controller is further configured to:

compare the outputs at the second grid size having the second resolution generated by the REM to the set of reference data to determine whether the outputs at the second grid size having the second resolution are within a select mismatch tolerance; and iteratively adjust one or more parameters of the physical simulation model when the outputs at the second grid size having the second resolution are outside of the select mismatch tolerance.

31. The system of claim 30, wherein the controller is further configured to:

obtain the set of reference data from the metrology subsystem.

32. The system of claim 23, wherein the controller is further configured to:

run a plurality of trials of the physical simulation model at the first grid size having the first resolution to produce a probabilistic distribution of the plurality of trials;

generate a plurality of outputs at the first grid size having the first resolution from the plurality of trials of the physical simulation model;

run the plurality of outputs at the first grid size having the first resolution through a post-processing model;

generate a plurality of post-processing model outputs at the first grid size having the first resolution via the post-processing model;

run the plurality of post-processing model outputs at the first grid size having the first resolution through the REM; and generate a plurality of outputs at the second grid size having the second resolution from the REM.

33. The system of claim 32, wherein the post-processing model includes a Monte Carlo simulation.

* * * * *